United States Patent [19]

Corkery

[11] Patent Number: 4,473,853

[45] Date of Patent: Sep. 25, 1984

[54] CONTROLLER FOR A VIDEOTAPE RECORDER, AND A METHOD THEREFOR

[75] Inventor: Joseph L. Corkery, San Carlos, Calif.

[73] Assignee: Sony Corporation, Tokyo, Japan

[21] Appl. No.: 402,713

[22] Filed: Jul. 28, 1982

[51] Int. Cl.³ ............................................. G11B 27/10
[52] U.S. Cl. .................................. 360/72.2; 360/14.3
[58] Field of Search .................... 360/33.1, 14.1, 14.2, 360/14.3, 72.2

[56] References Cited

U.S. PATENT DOCUMENTS

| | | | |
|---|---|---|---|
| 4,134,130 | 1/1979 | Tachi | 360/10.3 |
| 4,157,488 | 6/1979 | Allan | 360/73 |
| 4,195,317 | 3/1980 | Stratton | 360/72.1 |
| 4,195,319 | 3/1980 | Ida | 360/72.1 |
| 4,360,841 | 11/1982 | Mita | 360/14.3 |
| 4,360,843 | 11/1982 | Menezes et al. | 360/14.3 |
| 4,363,048 | 12/1982 | Tanaka et al. | 360/14.2 |

FOREIGN PATENT DOCUMENTS

| | | | |
|---|---|---|---|
| 47903 | 3/1979 | Japan | 360/72.2 |
| 48001 | 1/1980 | Japan | 360/72.2 |
| 48004 | 4/1980 | Japan | 360/72.2 |

Primary Examiner—Felix D. Gruber
Assistant Examiner—Oleg Schatoff
Attorney, Agent, or Firm—Philip M. Shaw, Jr.

[57] ABSTRACT

An improved controller for a VTR is disclosed. The VTR has a time code reader and a tape time reader, each generating a signal representative of the time length of the material recorded on the tape. The time code reader generates a signal derived from the time code recorded on the tape. The tape time reader generates a signal derived from the signals generated by a tachometer, connected to the tape transport mechanism. An interpolated time code is generated by means which adds an offset value to this tachometer derived time data. The offset value is periodically calculated by means which determines the difference between the time code data and the tachometer time code data after first determining that the tape speed has exceeded a predetermined threshold speed for a predetermined period of time. If the tape speed has not exceeded this predetermined threshold speed, then the last calculated offset is added to the tachometer derived data.

9 Claims, 11 Drawing Figures

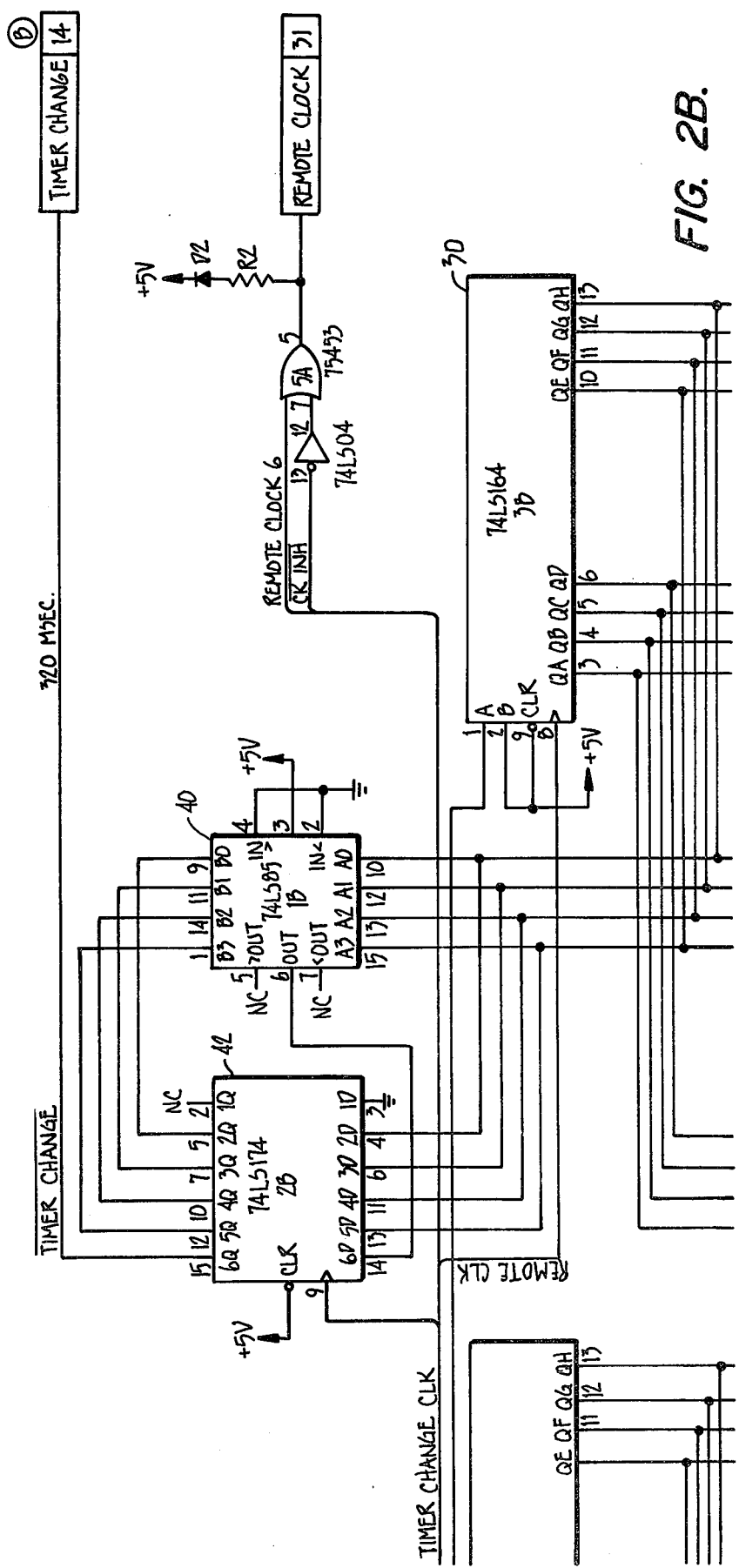

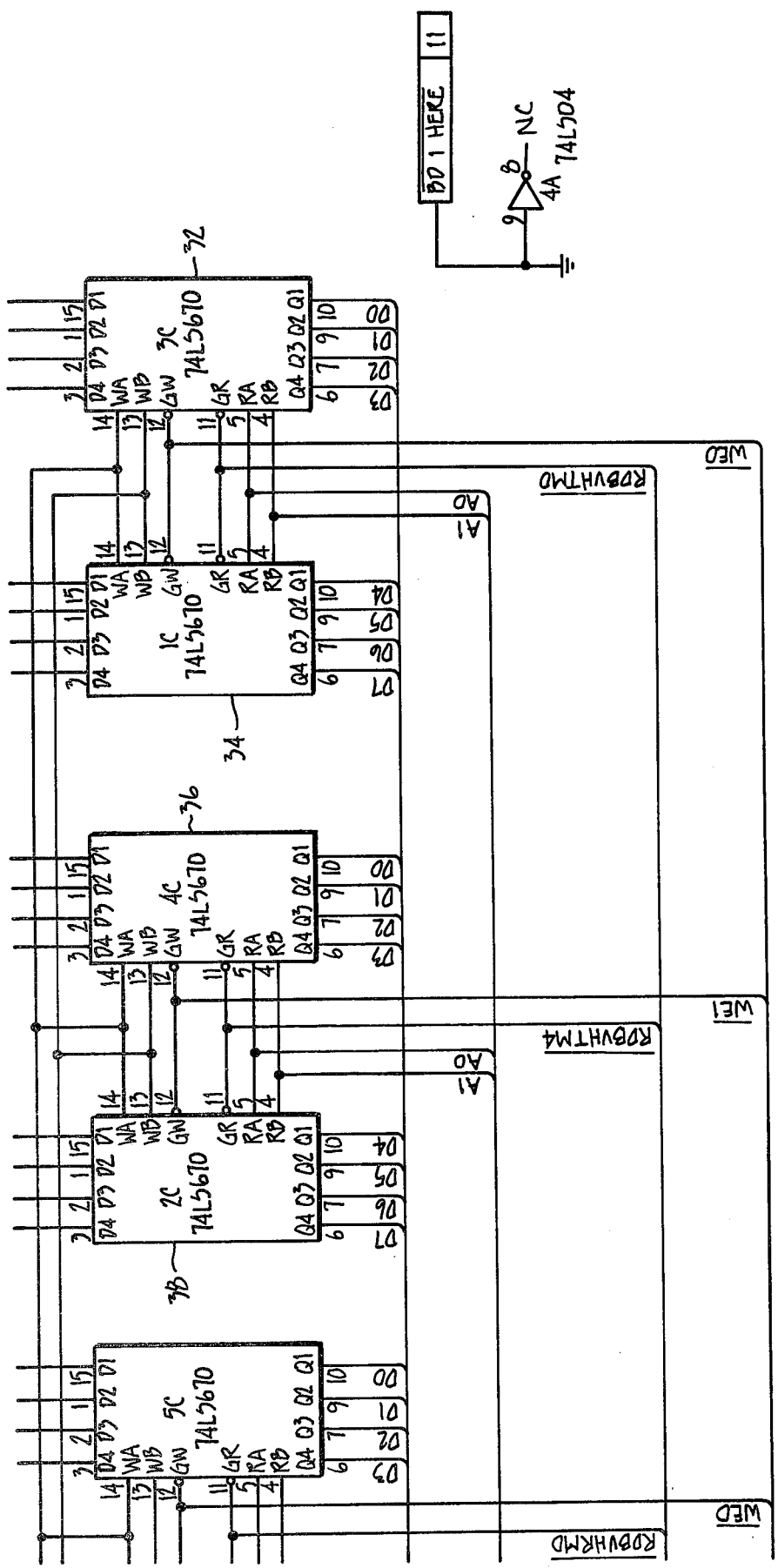

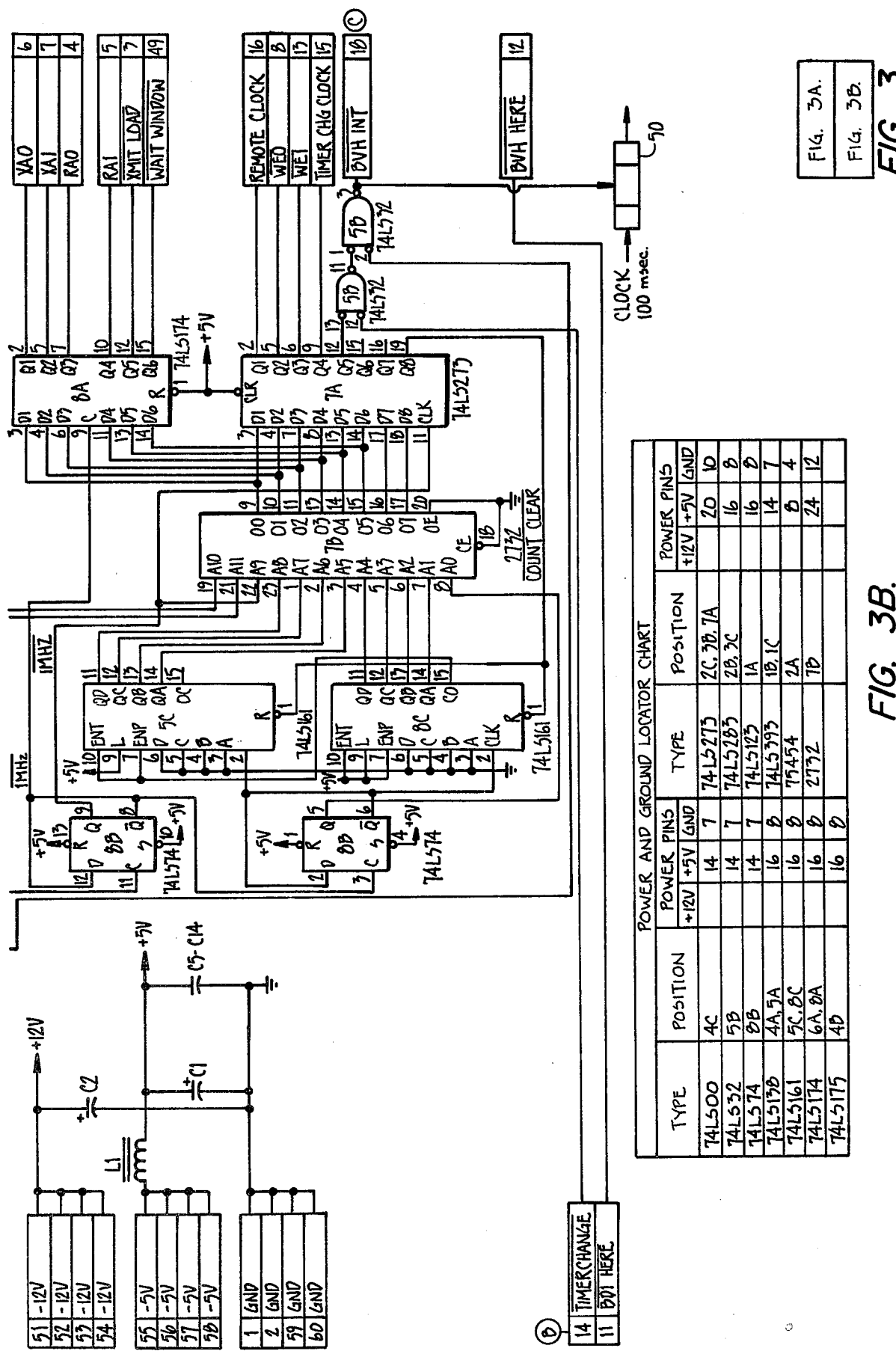

CONTROLLER FOR A VIDEOTAPE RECORDER, AND A METHOD THEREFOR

BACKGROUND OF THE INVENTION

The present invention relates to an improved controller for a videotape recorder (VTR) and, more particularly, to an improved controller for a VTR for use in tape editing and playback.

In the operation of broadcast-type VTRs, it is often desirable to be able to control the VTR and, more particularly, to control remotely the VTR to produce a number of special effects with the recorded program material, such as variable motion effects and post-production editing.

In order to control the VTR and to produce these special effects with the program material, which is recorded on the tape, the controller must selectively advance or rewind the tape on the VTR to a particular frame or frames.

The Society of Motion Picture and Television Engineers (SMPTE) has adopted a standard specifying that a timing code that corresponds to each frame of video information should be recorded on the audio track of the videotape. The timing code of each frame is read by a timing code reader producing a signal which is representative of the time length of the material recorded on the tape. The SMPTE standard further specifies that the timing code should be readable by the timing code reader when the videotape is transported over a wide range of speeds. By reading the timing code, the controller can selectively advance or rewind the tape on the VTR to a particular frame or frames.

In practice, however, the timing code cannot be accurately read by the timing code reader when the tape is transported at low speeds. Thus, control of the VTR cannot be accurately made.

A tachometer, which is connected to the transport mechanism of a VTR for moving the videotape, is well-known in the art. The tachometer generates signal pulses which are representative of the speed at which the tape is being transported. It is also well-known in the art that a tape time reader receives the signals from the tachometer and generates a signal which is representative of the time length of the material recorded on tape.

SUMMARY OF THE INVENTION

An improved controller for a VTR is disclosed. The VTR has a transport means for transporting a magnetic tape with a timing code recorded thereon. The VTR also has a tachometer means connected to the transport means for generating signal pulses representative of the speed at which the tape is being transported. An interpolated time code is generated by means which adds an offset value to this tachometer derived time data. The offset value is periodically calculated by means which determines the difference between the time code data and the tachometer time code data after first determining that the tape speed has exceeded a predetermined threshold speed for a predetermined period of time. If the tape speed has not exceeded this predetermined threshold speed, then the last calculated offset is added to the tachometer derived data.

BREIF DESCRIPTION OF THE DRAWINGS

FIG. 1 is a block diagram illustrating a VTR in conjunction with an improved controller of the present invention.

FIG. 2 (comprised of FIGS. 2A, 2B, 2C and 2D) is a schematic block diagram of a portion of the circuit of the improved controller of the present invention.

DETAILED DESCRIPTION OF THE DRAWINGS

Figure 1:
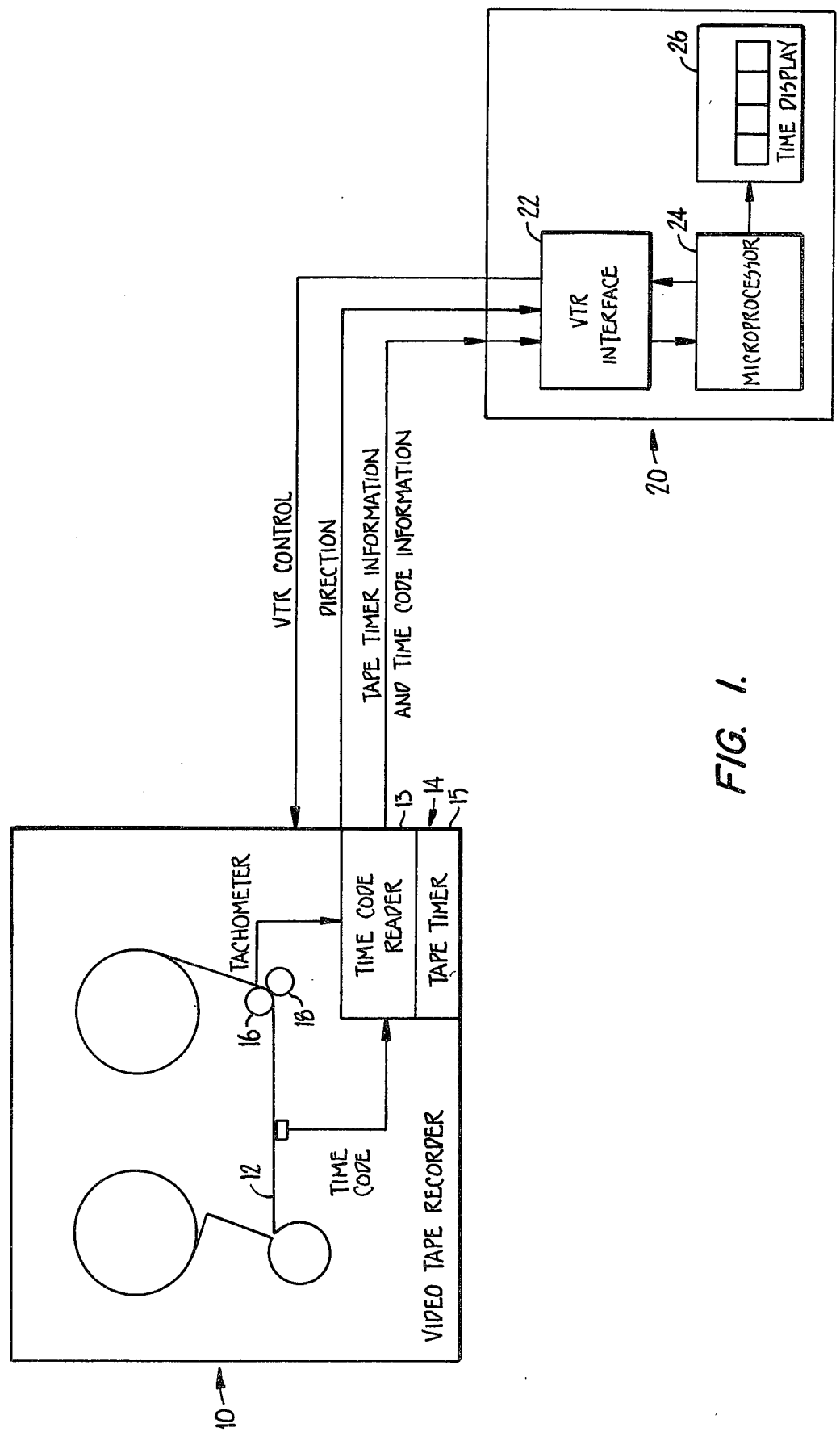

Referring now to FIG. 1, there is shown a videotape recorder (VTR), generally designated as 10. The VTR 10 has a transport means 18, such as a motor driven capstan, for transporting a magnetic tape 12. The tape 12 has a timing code recorded on the audio track thereof in accordance with the standard set by SMPTE. A timer means 14 comprises a time code reader 13 and a tape time reader 15. The time code reader 13 reads the timing code recorded on the tape 12 and generates a first signal, which is representative of the time length of the material recorded on the tape 12. The VTR 10 also comprises a tachometer 16, which is connected to the transport means 18 for generating signal pulses that are representative of the speed at which the tape 12 is being transported. The tape time reader 15 generates a second signal which is also representative of the time length of the material recorded on the tape 12. The first and the second signals from the timer means 14 are supplied to a controller, generally designated as 20. A typical VTR 10 is a BVH-1100, manufactured and marketed by SONY Corporation.

The improved controller 20 of the present invention is shown generally as comprising a VTR interface 22, a microprocessor 24, and a time display unit 26. The VTR interface 22 communicates with the VTR 10 by receiving information from the timer means 14, and other information including the direction of play of the VTR 10. In addition, the VTR interface 22 supplies the control signals from the controller 20 to the VTR 10. The particular aspects of the VTR interface 22 which is the subject of the present invention will be discussed hereinafter.

From the VTR interface 22, signals are supplied to a microprocessor 24. A typical microprocessor is a model Z-80, manufactured by Zilog Corporation. The microprocessor 24 processes the information supplied from the VTR interface 22 and/or the information supplied by the operator. In addition, the microprocessor 24 supplies the control signals to the VTR 10 through the VTR interface 22. Finally, time information from the microprocessor 24 is displayed on the display unit 26.

The theory of the present invention can be understood as follows: The time supplied by the time code reader 13 is, of course, based upon the timing code which has been recorded on the tape 12 and which was read by the VTR 10. The beginning of time for the timing code is usually the beginning of a program. The time supplied by the tape time reader 15 is based upon the amount of tape 12 travelling past the tachometer 16. The beginning of the time supplied by the tape time reader 15 is when the power to the VTR 10 is turned on. Unless a rare coincidence occurs, invariably, the time supplied from the time code reader 13 will be different from the time supplied by the tape time reader 15. However, as the tape 12 is being transported by the VTR 10, this difference in time will, in general, be a constant. This difference is calculated only when the speed of the VTR 10 is greater than the threshold speed, in accordance with the following formula:

Delta T = T.C. − T.T.

where T.C. is the time supplied by the time code reader 13 and T.T. is the time supplied by the tape time reader 15. This value of Delta T is calculated and is stored if the speed of tape 12 is greater than two-thirds the normal playing speed for at least one second. Thereafter, the calculation is made continuously, i.e. with each new value of T.C. or T.T. Delta T is calculated. The delay of one second is provided to ensure that the calculations are made when the VTR 10 is operating stably.

When the speed of the VTR 10 is less than the threshold speed, the value of Delta T is not calculated. Instead, the stored value of Delta T, i.e., the last calculated value of Delta T when the speed of the VTR 10 was above the threshold speed, is used.

The calculation for the time to be used by the microprocessor 24 and displayed on the time display 26 is in accordance with the following formula:

Display Time = Delta T + T.T.

Thus, when the speed of the VTR 10 is greater than the threshold speed, the display time is equal to the time from the time code reader 13. In other words, Display Time = (T.C. − T.T.) + T.T. = T.C.

However, when the speed of the VTR 10 is below the threshold speed, the display time is:

Display Time = Delta T (last stored value) + T.T. (current value)

Figure 2A:
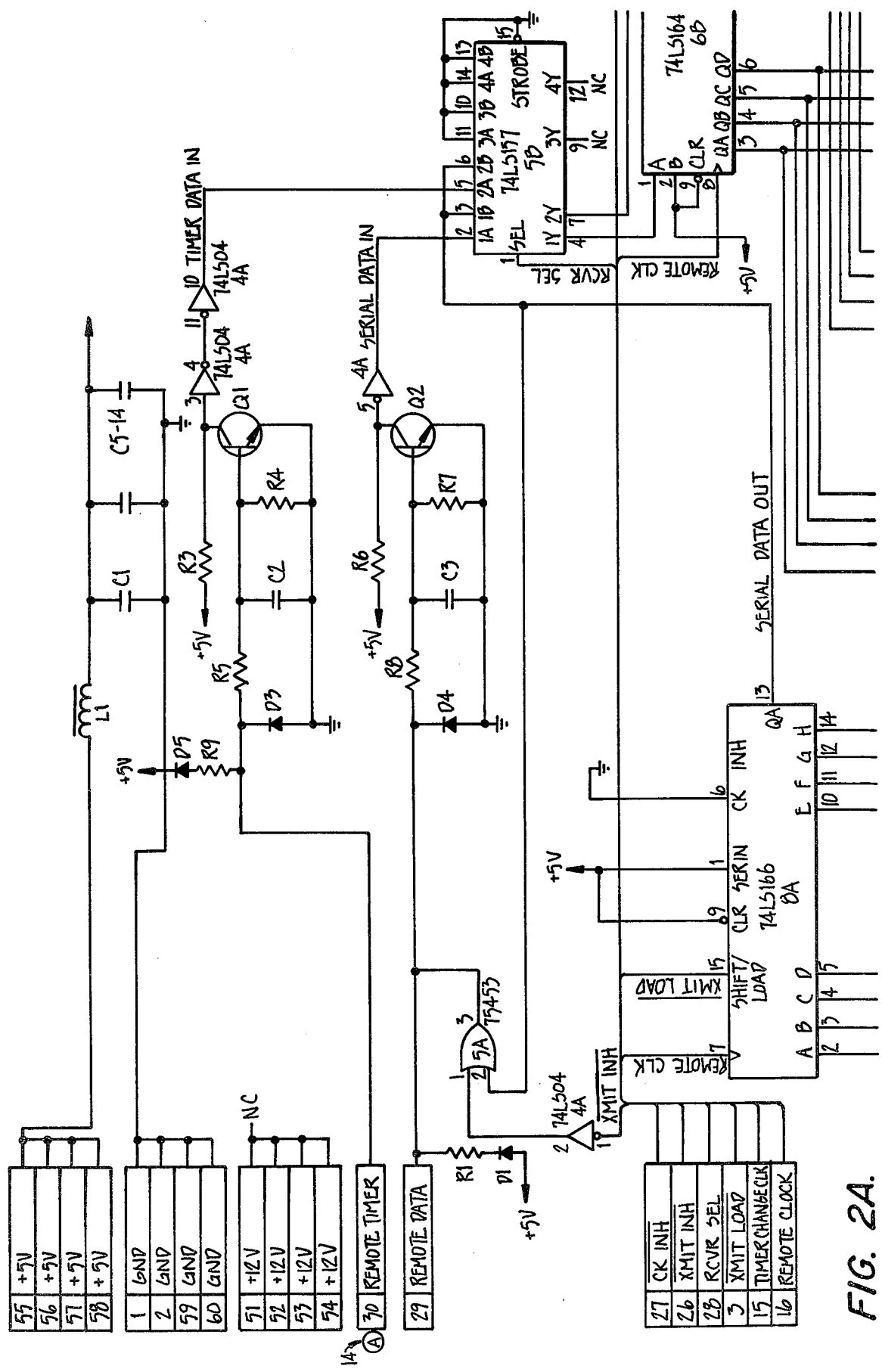
Figure 2C:
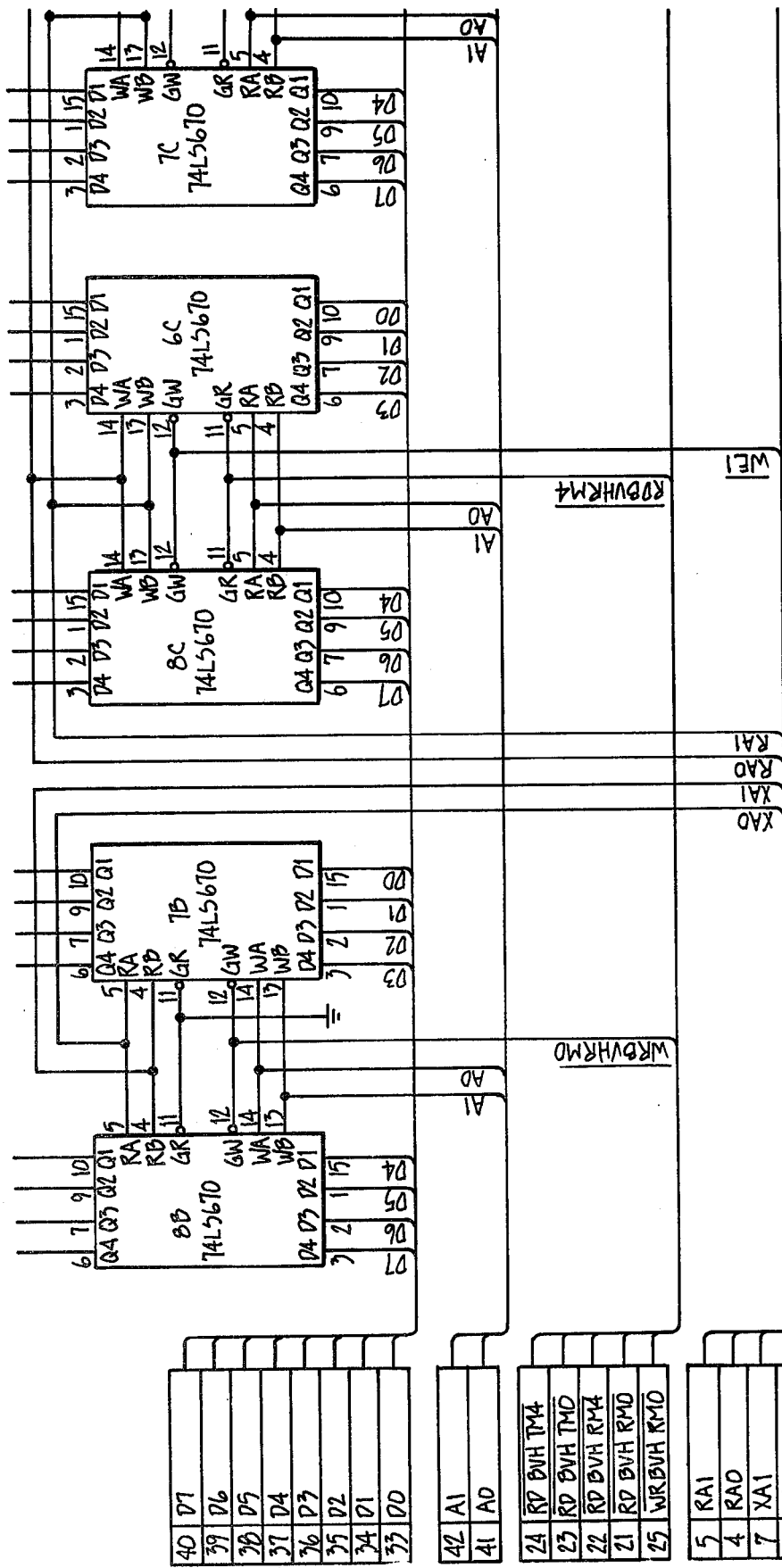

Referring to FIG. 2, there is shown a schematic circuit diagram of a portion of the VTR interface 22 of the present invention. In the event the VTR 10 is a BVH-1100, the signals supplied from the timer means 14 are supplied in the following format:

$H_{TTC} H_{TTT} H_{UTC} H_{UTT} M_{TTC} M_{TTT} M_{UTC} M_{UTT} S_{TTC} S_{TTT} S_{UTC} S_{UTT} F_{TTC} F_{TTT} F_{UTC} F_{UTT}$ where F is the frame number; S is in seconds; M is in minutes; and H is in hours; and where the subscript UTC represents units of time from the time code reader 13, the subscript TTC represents tens of units of time from the time code reader 13; the subscript UTT represents units of time from the tape time reader 15; and the subscript TTT represents tens of units of time from the tape time reader 15.

The time information from the time code reader 13 is interleaved with the time information from the tape time reader 15. The timer means 14 supplies the interleaved timing signal in a block of 64 bits divided into 4-bit units. The timing signal from the timer means 14 is supplied to the VTR interface 22 at the junction designated as A. The timing signal is supplied to a shift register 30 which converts serial bit stream data into parallel bit stream data.

From the shift register 30, the data is moved into (4) memory units 32, 34, 36, and 38, each having four bits of memory. Each of the memory units 32, 34, 36, and 38 is a two-port memory permitting data to be written in one port and to be read from the memory unit at another port. The data from these units 32, 34, 36 and 38 are supplied to the microprocessor 24 over an eight bit bus line. (The Z-80 is an eight bit microprocessor). By shifting the serial data, converting it into parallel data, writing into the memory units 32, 34, 36 and 38, and selectively reading the data from these units, the time information from the timing code reader 13 and from the tape time reader 15 are regrouped.

The particular manner of regrouping the time information is as follows. The signals $F_{UTC} F_{UTT}$ are first shifted into the shift register 30. While they are read into memory units 34 and 32, respectively, the signals $F_{TTC} F_{TTT}$ are shifted into the register 30. $F_{TTC} F_{TTT}$ are then written into memory units 38 and 36, respectively, while data from memory units 34 and 32 are read into the microprocessor 24. The data from memory unit 32 is read into the microprocessor 24 over four of the bus lines while the data from memory unit 34 is read over the other four bus lines. The data from the memory units 38 and 36 are read into the microprocessor 24 over the same bus lines as those from units 34 and 32, respectively. Thus, over the four bus lines, the time information will be:

$H_{TTT} H_{UTT} M_{TTT} M_{UTT} S_{TTT} S_{UTT} F_{TTT} F_{UTT}$ which is the time from the tape time reader 15.

Over the other four bus lines, the time information will be:

$H_{TTC} H_{UTC} M_{TTC} M_{UTC} S_{TTC} S_{UTC} F_{TTC} F_{UTC}$ which is the time from the time code reader 13.

Figure 3A:
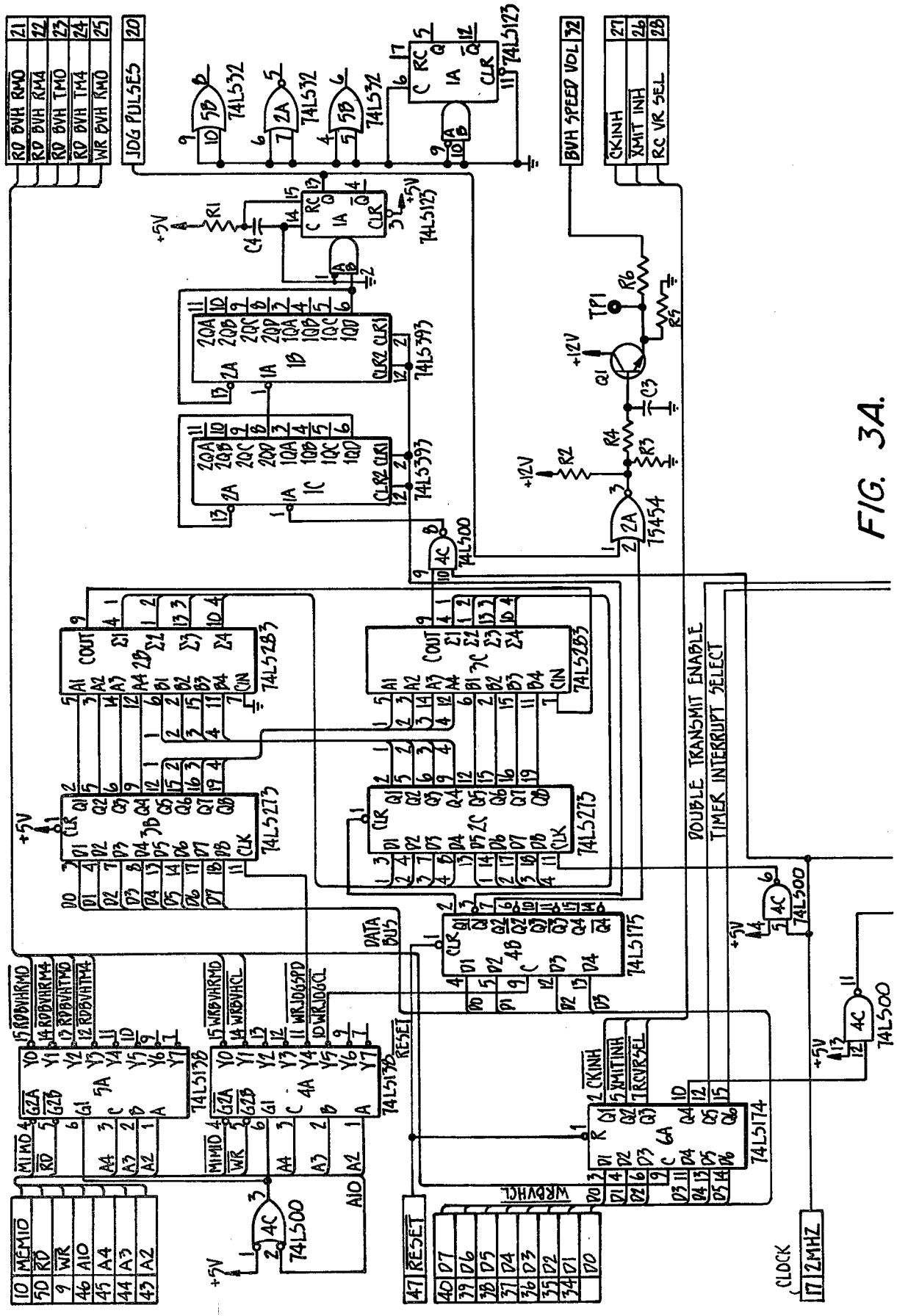
FIG. 3 (comprised of FIGS. 3A and 3B) is a schematic block diagram of another portion of the circuit of the controller of the present invention.

The unit count of the present frame, supplied by the tape time reader 15 is entered to a first storage 40. The subsequent unit count for the frame, as supplied by the tape time reader 15 is entered into the second storage 42. The value in the first storage 40 is compared to the value in the second storage 42 and, when the values are unequal, signifying a movement in the tape 12, the output designated as "B" goes low; otherwise, it remains high. This pulse is supplied to the portion of the circuit, shown in FIG. 3, and through appropriate NAND gates, the pulses from this comparison are thinned. The result is an interrupt signal which is designated as "C" and which is supplied to the microprocessor 24.

Each pulse from "B" is also counted in a counter 50 which is read and is reset every 100 msecs. Since in the normal playing speed of the VTR 10, thirty (30) frames per second are produced, this is equal to three (3) frames per 100 msec. If at least two pulses are counted in the 100 msec. duration by the counter 50, then the tape 12 is being transported at a rate of at least two-thirds of the normal playing speed.

Figure 4:
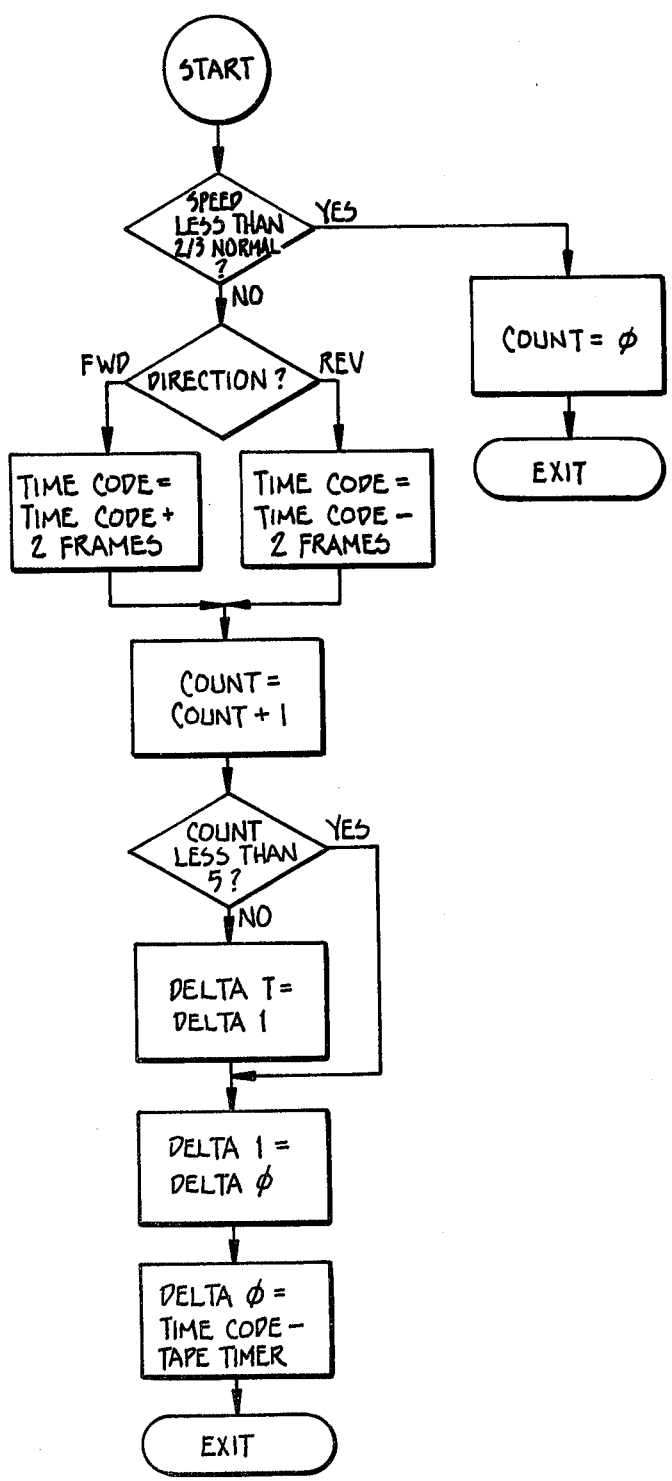
FIG. 4 is a flow chart depicting the calculation of the difference in time as determined by the time code reader and by the tape timer reader.

Within the microprocessor 24, a program makes a number of calculations. Referring to FIG. 4, there is a flow chart showing the calculation of "Delta T", a calculation which is made every 250 milliseconds.

Based upon the signal supplied at "C" and from the counter 50, the microprocessor 24 determines the speed at which the tape 12 is being transported. When the speed of a tape 12 is less than two-thirds the speed of the VTR 10 in the normal playing mode as determined by the counter 50, the identifier "COUNT" is set to zero. The program then terminates the calculation of "Delta T".

When the speed of the tape 12 being transported is determined to be greater than the threshold speed, the microprocessor 24 determines, based upon the direction signal from the VTR 10, whether the VTR 10 was playing in the forward mode or in the reverse mode. When the VTR 10 was playing in the forward mode, the time, as supplied by the time code reader 13, is advanced by two frames. This is because, in the forward mode, by the time the timing code is read from the tape 12, the tape 12 would have moved two frames. Conversely, when the VTR 10 is operating in the reverse mode, the time from the time code reader 13 is substracted by two frames. The identifier "COUNT" is then incremented by 1.

The program within the microprocessor 24 then proceeds to determine whether the "COUNT" is less than 5. In the event the "COUNT" is less than 5, an identifier "Delta 1" is set to the value of "Delta 0". "Delta 0" is then assigned the difference in time between the time from the time code reader 13 and the time from the tape time reader 15. The program then ends.

When the "COUNT" is five or more, the identifier "Delta T" is assigned the value from "Delta 1". The identifier "Delta 1" is assigned the value from "Delta 0". "Delta 0" is assigned the value which is the difference in time between the time from the time code reader 13 and the time from the tape time reader 15. The program then also terminates.

The value of "Delta T" is calculated only if the speed determined by the controller 20 is greater than the threshold speed for a predetermined period of time. This is necessary because the time code data used in calculating Delta T begins to become faulty as the tape speed drop below the required predetermined speed. The predetermined period of time eliminates problems caused by noise and the like.

In this case, the predetermined period of time is chosen to be when the value of "COUNT" is five or more, which corresponds to five or more passes through this program. Thus, the value of "Delta T" is not calculated until the speed which has been determined is greater than the threshold speed for at least one second. With each subsequent pass through this program, i.e., every 250 milliseconds, if the speed of the tape 12 being transported is still greater than the threshold speed, the value of "Delta T" which was obtained one-half second previously will be stored in "Delta T".

Figure 5:
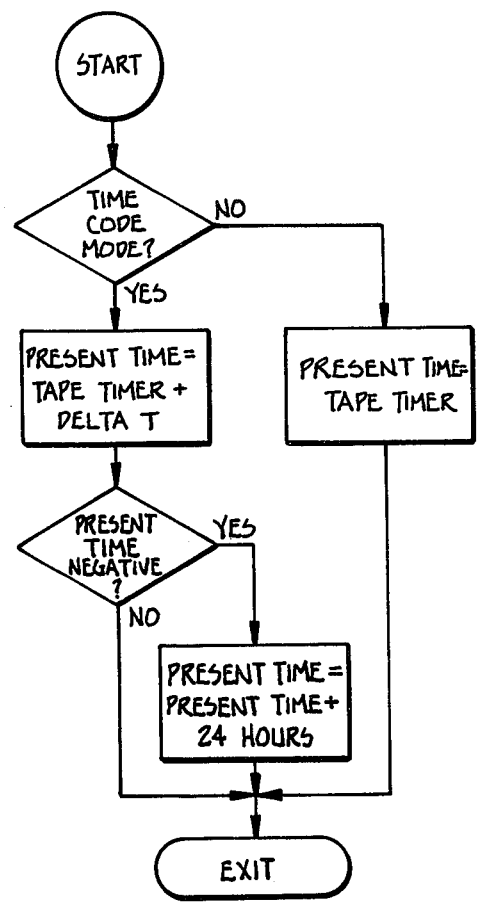
FIG. 5 is a flow chart depicting the calculation of time for display by the controller of the present invention.

Referring to FIG. 5, there is shown the calculation of the time which is made every 50 milliseconds. The program first determines whether or not the controller 20 is in the time code mode. If the VTR 10 does not have a time code reader 13 or the tape 12 does not have timing code recorded thereon, then the controller 20 is not in the time code mode. Then the time that is displayed on the display 26 is derived from the tape timer reader 15. The program then terminates.

When the controller 20 is in the time code mode, an identifier called "Present Time" is assigned the time from the tape time reader 15 plus the value of "Delta T". Since the timing code is on a 24-hour clock system but the time from the tape time reader 15 is not, it is possible for the present time to be negative. In the event the present time is negative, the present time is simply incremented by a 24-hour period. The program then terminates.

The method and apparatus of the present invention can be practiced with any VTR 10 that provides a time that is supplied by a time code reader, and a time that is supplied by a tachometer. If the time signals are not interleaved then that portion of the schematic circuit shown in FIG. 2 which is the serial to parallel register 30 and the two port memory units 32, 34, 36 and 38, would not be needed.

In addition, other circuits and apparatuses to determine the speed of the tape 12 being transported can also be used in lieu of the circuit shown in FIG. 2. The threshold speed can also be a different speed. The amount of delay for the calculation of Delta T can also vary. Finally, microprocessor 24 can be a circuit with hardware logic.

What is claimed is:

1. An apparatus for generating an interpolated time code in a videotape recorder of the type having a tape transport means for transporting a magnetic tape having a timing code recorded thereon, timing code reader means for reading said timing code from said tape as it is transported by the tape transport means and for generating a first timer data signal representative of said timing code, tachometer means connected to said tape transport means for generating a second timer data signal which is representative of the tape speed, the interpolated time code generating apparatus comprising:
    means responsive to the first and second timer data signals and for calculating an offset value by taking the difference of said first and second signals,
    logic means responsive to said second timer data signal for determining whether said tape speed is greater than or less than a predetermined threshold speed, and
    interpolater means controlled by said logic means for generating an output time code signal equal to said first timer data signal whenever said tape speed is greater than said predetermined threshold speed and for generating an output time code signal equal to said second signal plus said offset value at all other times.

2. In a videotape recorder of the type having a transport means for transporting a magnetic tape having a timing code recorded thereon, a tachometer means connected to said transport means for generating a signal representative of the speed at which said tape is being transported, a timer means for generating a first signal and a second signal, each of said signals representative of the time length of the material recorded on said tape, said first signal being derived from said timing code from said tape and said second signal being derived from the signal from said tachometer means, wherein the improvement comprises:
    means for determining the speed of said tape being transported;
    means for comparing said determined speed to a threshold speed;
    means for generating an interpolated timing signal from said first signal and said second signal; and
    logic means controlled by said comparing means for selecting said interpolated timing signal in the event said determined speed is less than said threshold speed and for selecting said first signal otherwise.

3. The apparatus of claim 2, wherein said generating means further comprising:
  means for calculating the difference in time length between the time length represented by said first signal and the time length represented by said second signal;
  means for storing said difference in time length in the event said determined speed is greater than said threshold speed; and
  means for combining said stored time with the time length represented by said second signal producing said interpolated timing signal.

4. The apparatus of claim 3, wherein said storing means further comprises
  means for storing said difference in time length in the event said determined speed is greater than said threshold speed for a predetermined period of time.

5. The apparatus of claim 4, wherein said predetermined period of time is one second.

6. The apparatus of claim 2 or 5, wherein said threshold speed is two-thirds of the speed of said videotape recorder in the normal playing mode.

7. A method of generating a timing signal in a videotape recorder of the type having a transport means for transporting a magnetic tape having a timing code recorded thereon, a tachometer means connected to said transport means for generating a signal representative of the speed at which said tape is being transported, a timer means for generating a first signal and a second signal each of said signals representative of the time length of the material recorded on said tape, said first signal being derived from said timing code from said tape and said second signal being derived from said tachometer means, wherein the method comprises the steps of:
  determining the speed of said tape being transported;
  comparing said determined speed to a threshold speed;
  generating an interpolated timing signal from said first signal and said second signal; and
  selecting said interpolated timing signal in the event said determined speed is less than said threshold speed and selecting said first signal otherwise.

8. The method of claim 7 further comprising the steps of:
  calculating the difference in time length between the time length represented by said first signal and the time length represented by said second signal;
  storing said difference in time length in the event said determined speed is greater than said threshold speed; and
  combining said stored time with the time length represented by said second signal producing said interpolated timing signal.

9. The method of claim 8, wherein said storing step further comprises the step of:
  storing said difference in time length in the event said determined speed is greater than said threshold speed for a predetermined period of time.

* * * * *